(12) United States Patent
Kees et al.

(10) Patent No.: US 6,744,148 B2
(45) Date of Patent: Jun. 1, 2004

(54) THEFT RESISTANT SYSTEM FOR VEHICLES EQUIPPED WITH COMBINED STARTER-ALTERNATORS

(75) Inventors: Donatus Andreas Josephine Kees, Basildon (GB); Jonathan Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 10/063,026

(22) Filed: Mar. 13, 2002

(65) Prior Publication Data
US 2003/0184159 A1 Oct. 2, 2003

(51) Int. Cl.[7] .................. B60R 24/04; B62H 5/00
(52) U.S. Cl. ....................... 307/10.3; 180/237
(58) Field of Search ................ 307/10.2, 10.3; 123/198 DL; 100/287

(56) References Cited
U.S. PATENT DOCUMENTS

| 4,209,709 A | | 6/1980 | Betton | |
| 4,288,778 A | | 9/1981 | Zucker | |
| 5,519,376 A | * | 5/1996 | Iijima | 340/426.35 |
| 5,684,339 A | * | 11/1997 | Treharne | 307/10.5 |
| 5,708,308 A | * | 1/1998 | Katayama et al. | 307/10.5 |
| 5,949,151 A | * | 9/1999 | Nakajima | 307/10.3 |
| 6,583,599 B1 | * | 6/2003 | Phillips et al. | 320/104 |

OTHER PUBLICATIONS

Knibb et al., 42 Volts—enabling a technological revolution, May 2001, Auto Briefing, pp. 2, 6.*

* cited by examiner

Primary Examiner—Gregory J. Toatley, Jr.
(74) Attorney, Agent, or Firm—Frank A. MacKenzie

(57) ABSTRACT

A theft resistant vehicle system (10) includes a security system (12) adapted to generate a first control signal as a function of the substantial meeting of a parameter for activating and a second control signal in response to a failure to meet the parameter. An inverter (22) is adapted to receive the control signals and is adapted to deactivate in response to the second control signal and is further adapted to generate an alternating current power signal in response to the first control signal. An electric machine (24) is adapted to receive the alternating current power signal.

26 Claims, 1 Drawing Sheet

THEFT RESISTANT SYSTEM FOR VEHICLES EQUIPPED WITH COMBINED STARTER-ALTERNATORS

BACKGROUND OF INVENTION

1. Technical Field

The present invention relates generally vehicle security systems and, more particularly, to a theft resistant system for vehicles incorporating starter-alternators.

2. Background Art

Combined Starter-Alternators (CSAs) are systems wherein the separate functions of engine cranking, performed by the starter motor, and electric energy generation, performed by the alternator, are combined into one 3-phase electric machine. Conventional starter motors are direct current electric machines whereas CSA systems are 3-phase alternating current electric machines. Conventional starter motors are powered directly from batteries, whereas 3-phase alternating current machines require power inverters (PI) that convert battery direct current into 3-phase alternating current.

Security systems are integrated into vehicles to prevent theft and are often embedded in the engine control module (ECM). Coded-key security systems operate by evaluating a key to determine if a specific engine start attempt is authorized. After proper authorization, the ECM activates both the fuel supply and the engine ignition system and closes the electric circuit that enables the starter motor to crank the engine.

If, however, proper authorization is not achieved, the fuel supply and ignition systems are disabled, the starter motor circuit is opened, and the vehicle is immobilized.

When the engine is immobilized, a new ECM with matching key is required to enable the vehicle to run. This results in significant cost and effort and acts as a deterrent for criminal activity. This deterrent would increase if the security system had the ability to disable other key vehicle systems that are costly to replace.

A primary limitation of the aforementioned security system is the ability to circumvent the electric circuit that enables engine cranking.

The limitation associated with current theft prevention techniques has made it apparent that a new technique to inhibit vehicle theft is needed. The new technique should substantially prevent circumvention of the electrical circuit that enables engine cranking and should increase vehicle component immobilization. The present invention is directed to these ends.

SUMMARY OF INVENTION

The present invention provides a theft resistant vehicle system. The present invention also provides a theft resistant system for vehicles equipped with combined starter-alternators.

In accordance with the present invention, a theft resistant vehicle system, including an activation unit adapted to generate a control signal as a function of an activation parameter, is disclosed. An alternating current power transfer unit is adapted to deactivate when no activation parameter control signal is received therein and is further adapted to generate an alternating current power signal in response to an activation parameter control signal. An electric machine receives the alternating current power signal.

One advantage of the current invention is that the electric machine is powered by alternating current and, by deactivating the activation unit when a deactivation parameter is met, alternating current is substantially prevented from reaching the electric machine. This inhibits activation of the electric machine through any other current sources.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a theft resistant vehicle system, particularly suited to the automotive field. The present invention is, however, applicable to various other uses that may require theft resistance, as will be understood by one skilled in the art.

Figure 1:
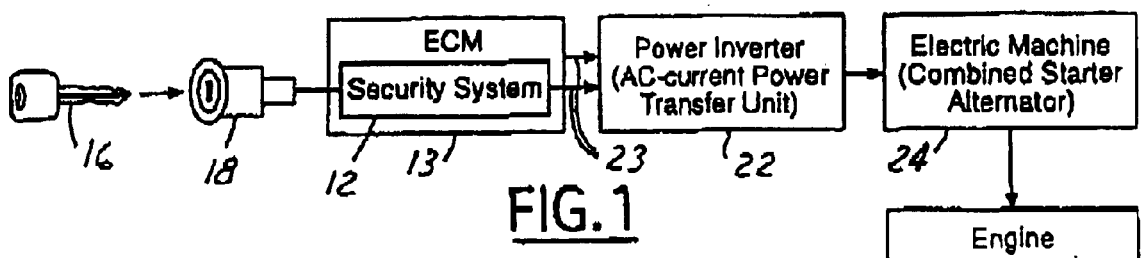
FIG. 1 is a theft resistant vehicle system in accordance with an embodiment of the present invention.
Figure 2:
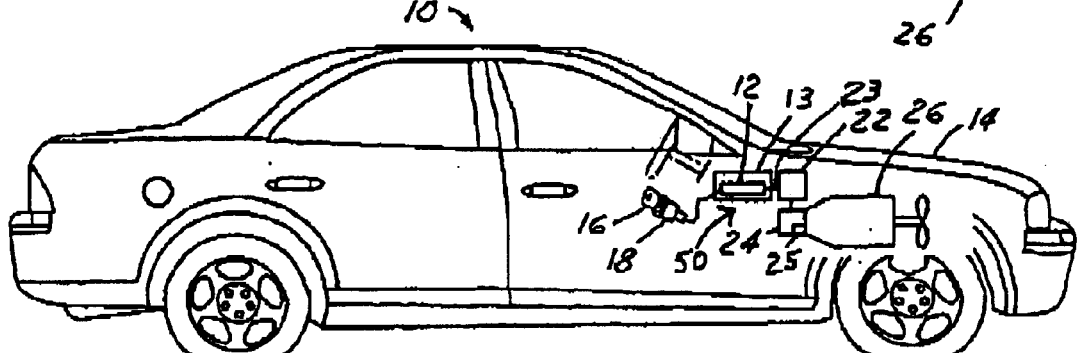
FIG. 2 is a block diagram of the theft resistant system of FIG. 1.

Referring to FIG. 1, a theft resistant vehicle system 10, including a security system 12, which is embedded in an engine control module 13 (ECM), is disclosed. The vehicle 14 is represented as an automobile, however it is to be understood that the present invention is embodied with various alternate machines requiring security systems. The vehicle 14 contains a key 16 adapted to activate an ignition switch 18. The signal from the ignition switch 18 is received in the security system 12 to determine whether the attempted activation is authorized, which will be discussed later.

The security system 12 signals the power inverter 22 to activate or deactivate. The power inverter 22 activates the electric machine 24, which subsequently drives i.e., cranks, the engine 26.

The embodied security system 12 is embedded in the ECM 13 and functions as an activation unit 50 (i.e., the security system 12 activates the inverter 22), which is adapted to generate a control signal as a function of at least one activation parameter, such the input of a key 16 coded to the security system 12. One skilled in the art will realize that the security system 12 is alternately incorporated in numerous other vehicle systems, such as the powertrain control module (PCM), or combinations thereof or in an independent security control system. The security system 12 is embedded to inhibit unauthorized persons from accessing the signals that are exchanged between the ignition switch 18 and the security system 12 to unlock the ECM 13 after receipt of the authorized key 16. When an authorized key 16 is identified, the security system 12 in the ECM 13 sends a signal to unlock the 3-phase power inverter 22.

The power inverter 22 is adapted to receive the activation signal and is adapted to provide an alternating current power signal in response to the activation signal. The power inverter 22 is further adapted to receive the deactivation signal and deactivate in response to the deactivation signal. An electric machine 24 is coupled to the power inverter 22 and receives the alternating current power signal. Upon activation by the AC power signal, the electric machine 24 drives the engine 26, as will be understood by one skilled in the art.

The embodied security system 12 is embedded in the ECM 13 and functions as an activation unit (i.e., the security system 12 activates the inverter 22), which is adapted to generate a control signal as a function of at least one activation parameter, such the input of a key 16 coded to the security system 12. One skilled in the art will realize that the security system 12 is alternately incorporated in numerous other vehicle systems, such as the powertrain control module (PCM), or combinations thereof or in an independent security control system. The security system 12 is embedded to inhibit unauthorized persons from accessing the signals that are exchanged between the ignition switch 18 and the security system 12 to unlock the ECM 13 after receipt of the authorized key 16. When an authorized key 16 is identified, the security system 12 in the ECM 13 sends a signal to unlock the 3-phase power inverter 22.

The security system 12 contains a first parameter for deactivating, such as an unauthorized vehicle start attempt, and a second parameter for activating, such as an authorized key activation. The security system 12 is adapted to generate a control signal as a function of at least one of the parameters. In other words, inputs to the ignition switch 18 are analyzed through parameters pre-set in the security system 12. If the input is within an acceptable range or set of parameters for an authorized key, the security system 12 signals the inverter 22 to unlock or activate. If the input is outside the aforementioned parameters or within a second set of parameters for unauthorized keys, the security system 12 signals the inverter 22 to disable.

The system 10 is embodied with the Ford Motor Company Passive Anti-Theft System (PATS) or equivalent. With such a system, the key 16 includes an electronic memory device, which stores a unique security code. Preferably, the electronic memory device is a transponder, as will be understood by one skilled in the art. The key 16 is used to operate a lock switch 17 which, for example, has at least two operating positions, e.g. an "off" and an "on" position. When the key 16 is coupled to the lock switch 17, and the switch is in the "on" position, the transponder is energized to transmit the security code associated with the key 16 to the security system 12. The security system 12 then compares the security code received from the transponder to the security code stored in memory. If the received security code is not equal to the security code stored in the memory of the security system 12, then an unauthorized operator flag is set.

Another embodiment includes embedding a microchip in a position sensor 25 of the electric machine 24 to control internal functionality to disable and immobilize the output of positional data at the end of a session of prior authorized usage. The output of positional data only becomes functional again after the correct key is received by the microchip from the PI 22 using the existing hard wires, which connect the position sensor and the PI 22.

The electric machine 24 is coupled to the inverter and receives the alternating current power signal when the inverter 22 is activated. The electric machine 24 is embodied as a combined starter-alternator (CSA). The current CSA is realized in several alternate embodiments that drive the engine 26, following are three examples of the numerous embodied CSA locations and designs. A first embodiment includes the CSA connected to the engine crankshaft through a belt drive system. A second embodiment includes the CSA replacing the engine flywheel at the engine crankshaft. A third embodiment includes the CSA replacing the conventional starter motor connected to the engine 26 through a ring wheel gear or drive chain.

Another embodiment includes embedding a microchip in a position sensor of the electric machine 24 to control internal functionality to disable and immobilize the output of positional data at the end of a session of prior authorized usage. The output of positional data only becomes functional again after the correct key is received by the microchip from the PI 22 using the existing hard wires, which connect the position sensor and the PI 22.

Upon receipt of the "key off" message (i.e. the end of an authorized session of usage) from the ECM 13, the PI 22 establishes encrypted communication with the microchip in the electric machine 24. The PI 22 essentially generates a new and unique key at the end of every usage session, and the unique key is transferred to the microchip via the encrypted communication. The microchip stores the key data into non-volatile memory and, after verification that this has been completed, it disables further communication of positional information.

When the PI 22 itself has been successfully activated at the beginning of a new start attempt, the PI 22 then sends the key via the encrypted link to the electric machine 24, which, as a result, will enable output of positional information. The added benefit is that even when an unauthorized cranking attempt is made by means of attaching the 3-phase electric machine 24 to a foreign 3-phase power inverter of the same design, the attempt fails because the required positional information is locked and substantially unavailable.

Figure 3:
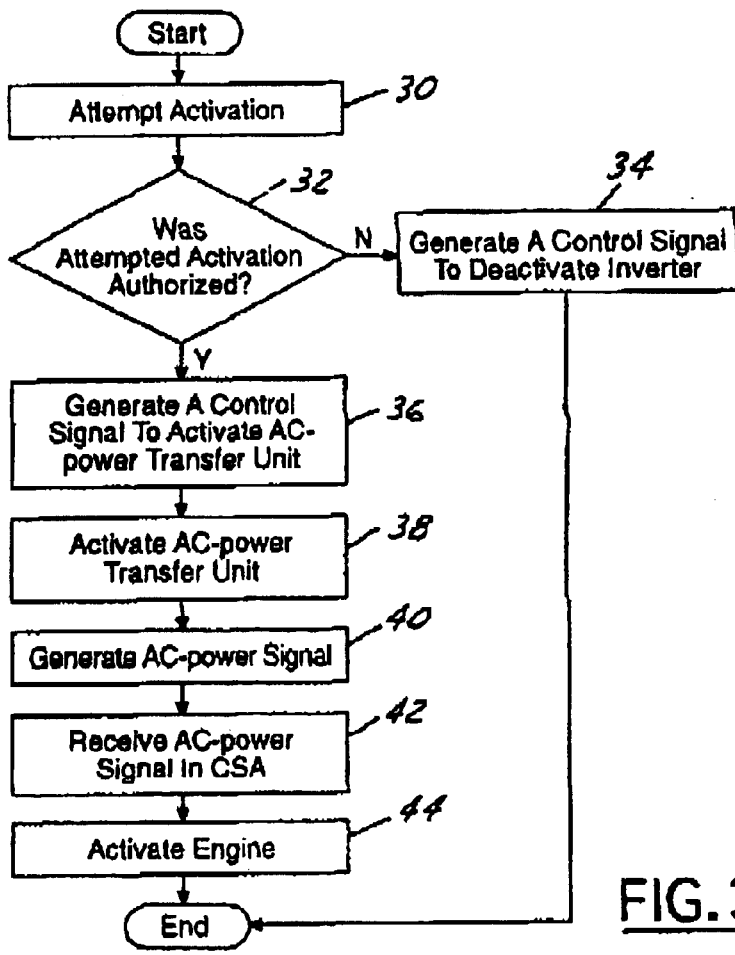
FIG. 3 is a block diagram of a method for improving vehicle theft resistance in accordance with an embodiment of the present invention.

Referring to FIG. 3, a block diagram of a method for improving vehicle theft resistance is disclosed. The method starts in operation block 30, when activation of the ignition is attempted from a key. A check is made in inquiry block 32 as to whether the attempted activation was authorized. For a negative response, i.e. the key is not coded to the security system, operation block 34 activates and the security system generates a control signal to deactivate the inverter.

Otherwise, in operation block 36, the security system generates a control signal to activate the AC power transfer unit (inverter). The AC power transfer unit generates an AC power signal in operation block 40, which is received in the electric machine (CSA) in operation block 42. This signal then activates the engine in operation block 44.

In operation, a key or other ignition device is applied to the ignition switch. If the key is authorized, i.e. it is coded for the security system, the security system unlocks or activates the inverter. The inverter then transfers AC power to the combined starter-alternator, which drives the engine. For an unauthorized key, the security system locks, deactivates or immobilizes the inverter. Following inverter immobilization, there is no mechanism in the vehicle for providing the requisite 3-phase alternating current to the CSA.

In engine cranking mode, the 3-phase power inverter (PI) source and the rotor of the electric machine are adapted to maintain a controlled phase angle between the electric supply current and the position of the moving rotor. If the aforementioned fail to maintain this however, the electric machine is unable to generate a meaningful mechanical output torque on its shaft and thus is unable to crank the engine. When this occurs, a communication link is required between the electric machine and the PI, which provides the positional information of the rotor.

This communication link requirement substantially prevents cranking torque reception from a DC energy source and impedes cranking torque reception from an alien 3-phase current source offered to the electric machine. In effect, torque provision will not occur by connecting a second PI module of the same design to the electric machine.

The current invention incorporates disabling features in the security system to disable the power inverter of the CSA system when an unauthorized key is presented to the security system. An encrypted means of communication is installed between the security system and the power inverter. This prevents the engine from cranking when an unauthorized key or unauthorized start-up attempt is executed. The significant advantage over existing systems is that circumventing the power inverter is substantially difficult because the electric machine requires a synchronized 3-phase current to function. Installing a high current wire from the direct current (DC) battery to the electric machine to circumvent the security system, therefore, will not permit the engine to crank, as will be understood by one skilled in the art.

From the foregoing, it can be seen that there has been brought to the art a new theft resistant vehicle system. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. A theft resistant system comprising:
   an activation unit adapted to generate a first control signal in response to a substantial meeting of a parameter for activating, said activation unit further adapted to generate a second control signal in response to a failure to meet said parameter for activating:
   an alternating current power transfer unit adapted to receive said first control signal and said second control signal, said alternating current power transfer unit adapted to generate an alternating current power signal as a function of said first control signal and deactivate in response to said second control signal;
   an electric machine coupled to said alternating current power transfer unit responsive to said alternating current power signal; and
   a position sensor coupled to said electric machine outputting positional data to said alternating current power transfer unit.

2. The system of claim 1, wherein said activation unit comprises a security system.

3. The system of claim 2, wherein said security system is embedded in a vehicle engine control module.

4. The system of claim 2, wherein said security system is coupled to a passive anti-theft system.

5. The system of claim 1, wherein said alternating current power transfer unit comprises a three phase power inverter.

6. The system of claim 1, wherein said electric machine comprises a combined starter-alternator.

7. The system of claim 1, wherein said position sensor is adapted to internally disable output of positional data.

8. The system of claim 1, wherein said electric machine is coupled to an engine crankshaft.

9. The system of claim 8, wherein said electric machine is coupled to an engine crankshaft through a belt drive.

10. The system of claim 8, wherein said electric machine comprises a flywheel coupled to said engine crankshaft.

11. The system of claim 1, wherein said electric machine is a starter motor.

12. The system of claim 11, wherein said electric machine is coupled to an engine through a ring wheel gear or a chain drive.

13. The system of claim 1, further comprising a key being coded to said activation unit.

14. A method for improving vehicle theft resistance comprising the steps of:
   generating a control signal in an activation unit as a function of an authorized vehicle start attempt;
   receiving said control signal in an alternating current power transfer unit;
   generating an alternating current power signal in response to said control signal;
   receiving said alternating current power signal in an electric machine; and
   outputting positional data from a position sensor coupled to said electric machine to said alternating current power transfer unit.

15. The method of claim 14, wherein generating a control signal further comprises generating an activation signal in response to an authorized key activation.

16. The method of claim 14, wherein generating a control signal further comprises generating a deactivation signal in response to an unauthorized vehicle start attempt.

17. The method of claim 14, further comprising disabling said alternating current power transfer unit until an authorized key is received.

18. A theft resistant vehicle system, comprising:
   a security system adapted to generate an activation signal in response to an authorized key activation, said security system further adapted to generate a deactivation signal in response to an unauthorized vehicle start attempt;
   a power inverter adapted to receive said activation signal and adapted to generate an alternating current power signal in response to said activation signal, said power inverter further adapted to receive said deactivation signal and deactivate in response to said deactivation signal;
   an electric machine coupled to said power inverter for receiving said alternating current power signal; and
   a position sensor coupled to said electric machine outputting positional data to said alternating current power transfer unit.

19. The system of claim 18, wherein said electric machine comprises an alternator.

20. Th system of claim 18, wherein said electric machine is coupled to an engine crankshaft.

21. The system of claim 20, wherein said electric machine is coupled to an engine crankshaft through a belt drive.

22. The system of claim 20, wherein said electric machine is a flywheel coupled to said engine crankshaft.

23. The system of claim 18, wherein said electric machine is a starter motor.

24. The system of claim 23, wherein said electric machine is coupled to an engine through a ring wheel gear or a chain drive.

25. The system of claim 18, wherein said security system is embedded In a vehicle control module.

26. The system of claim 18 wherein said position sensor comprises a means for automatically disabling output of positional data following receipt of a "key off" message, said means enabling output of positional data following a subsequent authorized key activation.

* * * * *